United States Patent [19]

Chia et al.

[11] Patent Number: 5,096,012

[45] Date of Patent: Mar. 17, 1992

[54] DIRECTION AND LIFT CONTROL FOR HOVERCRAFT

[75] Inventors: Louis Chia; Satoaki Omori, both of Anaheim, Calif.

[73] Assignee: American Hovercraft & Sports, Inc., Anaheim, Calif.

[21] Appl. No.: 492,615

[22] Filed: Mar. 12, 1990

[51] Int. Cl.⁵ ............................................... B60V 1/14
[52] U.S. Cl. ................................. 180/117; 180/118; 180/120
[58] Field of Search ................. 180/116, 117, 118, 120

[56] References Cited

U.S. PATENT DOCUMENTS

| | | | |
|---|---|---|---|
| 3,870,121 | 3/1975 | Schneider | 180/117 |
| 3,931,942 | 1/1976 | Alpert | 180/117 |
| 4,848,501 | 7/1989 | Goodwin et al. | 180/117 |

FOREIGN PATENT DOCUMENTS

| | | | |
|---|---|---|---|
| 1200443 | 7/1970 | United Kingdom | 180/120 |
| 2068310 | 8/1981 | United Kingdom | 180/117 |
| 2091659 | 8/1982 | United Kingdom | 180/116 |
| 2094733 | 9/1982 | United Kingdom | 180/116 |

*Primary Examiner*—Mitchell J. Hill
*Attorney, Agent, or Firm*—Roy A. Ekstrand

[57] ABSTRACT

A hovercraft includes a hull having a plurality of diffusion apertures and air skirt for providing a supporting air cushion. An engine drives a propeller which produces an airflow. A movable elevator dynamically divides the propeller airflow between lift and thrust components. A pair of rudders are supported within the thrust component to provide steering.

8 Claims, 3 Drawing Sheets

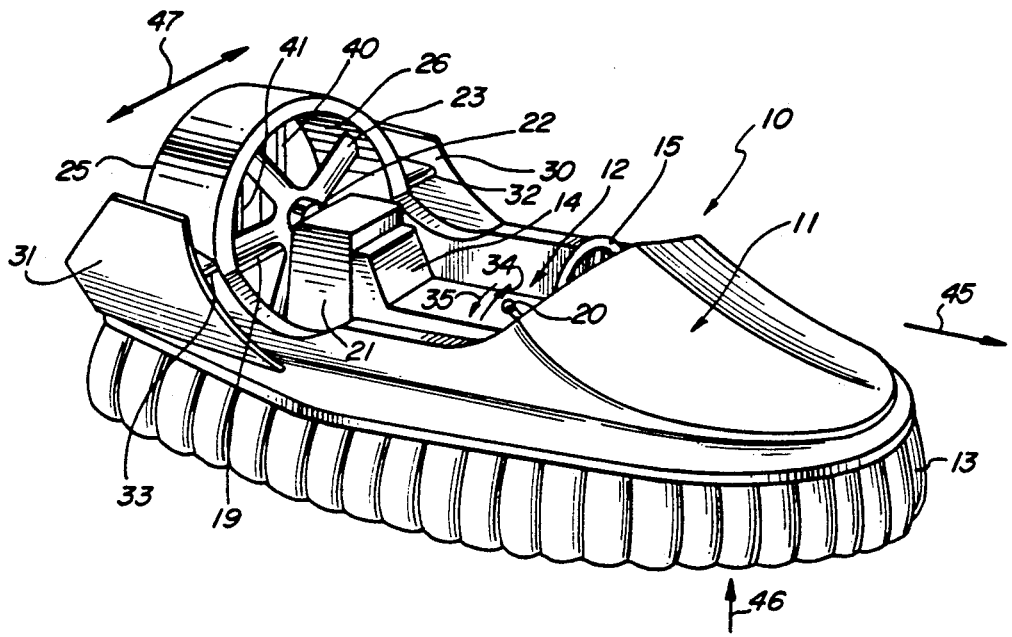
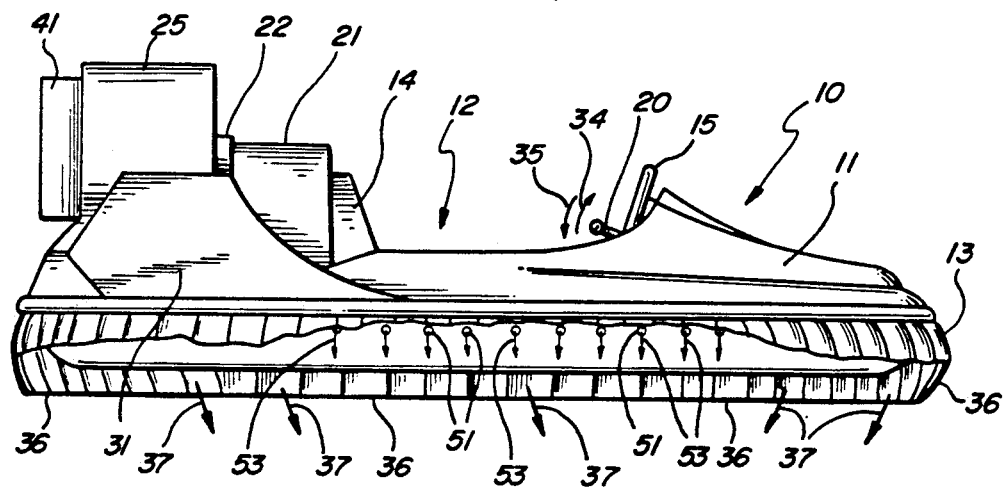

DIRECTION AND LIFT CONTROL FOR HOVERCRAFT

FIELD OF THE INVENTION

This invention relates generally to hovercraft vehicles and particularly to the control systems utilized therein.

BACKGROUND OF THE INVENTION

One of the more exciting types of movable craft produced in recent years has been the specie of movable craft generally referred to as hovercrafts. While the configuration, shape and operative elements of such hovercraft assume a variety of configurations, all generally comprise the basic elements of a hull and support structure usually formed of a lightweight rigid material together with an onboard power source such as a gasoline engine or the like. The gasoline engine is coupled to a propeller or similar fan element which is driven at high speeds to provide a forward thrust to propel the hovercraft. One or more generally planar rudders are provided to direct some or all of the propulsion stream of air to provide hovercraft steering. The hull further defines a hollow plenum which receives a portion of the airflow produced by the propeller. A plurality of air directing apertures within the hull convert the portion of the propeller air stream within the plenum into a downwardly directed air cushion. In most instances, a flexible barrier or skirt surrounds the hull about its periphery and is operative to direct and captivate the diffused air to produce a supporting air cushion beneath the hovercraft vehicle.

Hovercraft provides several basic advantages not achievable with conventional boats or similar vehicles. Among these advantages are the capability of the hovercraft to move across a variety of different terrains and surfaces supported solely by its underlying air cushion. Thus, a hovercraft is capable of moving with equal ability over the surface of bodies of water, dry land surfaces, or shallow swamp-like surfaces with great ease. This leads to substantial advantages in versatility and convenience of use. In addition, because the hovercraft moves above the surface of a body of water, it easily avoids submerged hazards and is capable of obtaining greater speeds with less power. In addition, the absence of draft generally associated with other types of vehicles moving across water such as boats, permits the hovercraft to be highly maneuverable and very unlikely to tip over.

Despite the numerous advantages associated with hovercrafts however, a basic problem has been encountered which manifests itself as a difficulty of controlling the hovercraft. While experienced operators become skilled in maneuvering and operating hovercrafts and are able to overcome such difficulties, novices or relatively inexperienced operators often have substantial problems in maneuvering and operating the hovercrafts.

These problems have led practitioners in the art to develop hovercraft which are basically compromised in their design. The most typical compromise involves the reduction of forward thrust and a proportional increase in hovering or lifting force to increase the stability of the hovercraft. Because this sacrifice of speed is often undesirable to certain hovercraft users, practitioners in the art have also provided different versions of hovercraft suited either to maximize speed with its attendant difficulty of control or maximize stability with its attendant reduced speed.

While the foregoing hovercraft provided by practitioners in the art has obtained some level of commercial success, there arises a need in the art for a system of direction and lift control for hovercraft which maximizes the craft's potential while adapting it to use for inexperienced operators.

SUMMARY OF THE INVENTION

Accordingly, it is a general object of the present invention to provide an improved direction and lift control for hovercraft. It is a more particular object of the present invention to provide an improved direction and lift control for hovercraft which may be multiply configured to meet the operator's needs. It is a still more particular object of the present invention to provide an improved direction and lift control for hovercraft which provides dynamic compensation of craft operation.

In accordance with the present invention, there is provided a control system for use in a hovercraft having an engine driven propeller and supporting hull, comprises: a propeller shroud enclosing the propeller such that propeller induced airflow passed into the shroud; an elevator member, pivotally supported within the propeller shroud directing a portion of the propeller induced airflow into the supporting hull as a function of the position of the elevator member; and lift/thrust control means, coupled to the elevator member, for positioning the elevator member at a desired angular position to divert the desired portion of propeller induced airflow into the hull.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a hovercraft having the present invention direction and lift control;

FIG. 2 sets forth a partially sectioned side view of the hovercraft of FIG. 1;

DESCRIPTION OF THE PREFERRED EMBODIMENT

Figure 3:
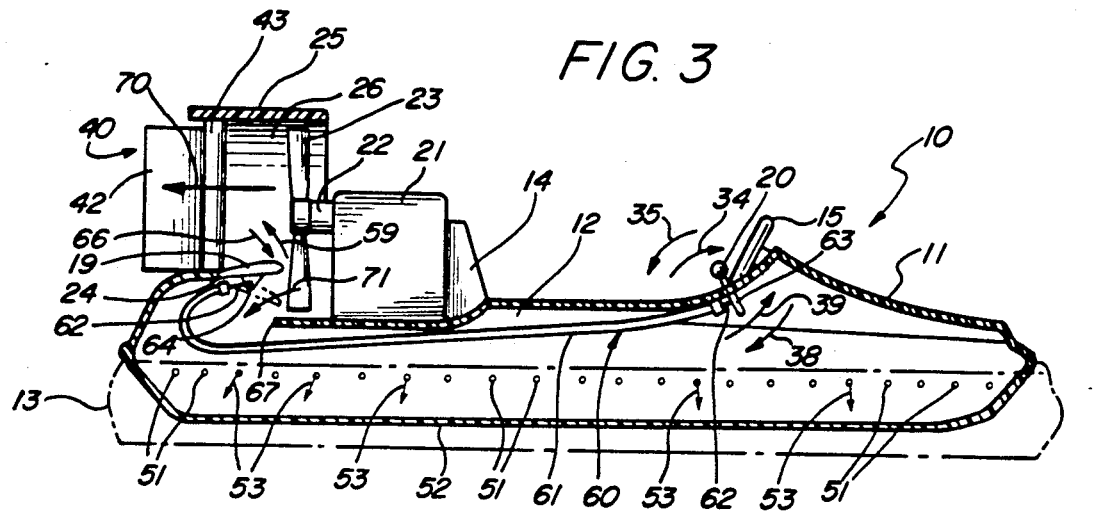
FIG. 3 sets forth a partially sectioned side view of the hovercraft of FIG. 1.

FIG. 1 sets forth a perspective view of a hovercraft constructed in accordance with the present invention and generally referenced by numeral 10. Hovercraft 10 includes a lightweight molded hull 11 defining an upwardly facing open cockpit compartment 12 having supported therein an elongated seat 14. A generally cylindrical propeller shroud 25 is continuous with cockpit 12 and defines a cylindrical internal passage 26. Hull 11 further defines a pair of generally planar upwardly extending side stabilizers 30 and 31 supported on either side of propeller shroud 25. A pair of small wing segments 32 and 33 extend between side stabilizers 30 and 31 respectively and are joined to propeller shroud 25. A multiple segment air skirt 13 is joined to hull 11 and extends downwardly therefrom in accordance with conventional fabrication techniques.

A motor 21 constructed in accordance with conventional fabrication techniques is supported within cockpit 12 and is coupled to a gear reduction drive 22. A propeller 23 having a plurality of radially extending blades is directly coupled to gear drive 22 and is rotatably supported thereby within passage 26 of propeller shroud 25.

In accordance with the invention, a movable elevator member 19 is supported within passage 26 on the rearward side of propeller 23. In further accordance with the present invention, a pair of vertically supported rudders 40 and 41 are supported within passage 26 of propeller shroud 25 and extend therebeyond. A steering wheel 15 is supported within cockpit 12 and is operatively coupled to rudders 40 and 41 be means set forth below in greater detail. A lift and thrust control 20 is supported within cockpit 12 and, by means set forth below in greater detail, is operatively coupled to elevator 19.

In operation, motor 21 provides a power source which produces operative power coupled through gear drive 22 to cause propeller 23 to be rotated at a high speed within passage 26. The rotation of propeller 23 in turn produces a high speed airflow from front to back within passage 26. The airflow produced by propeller 23 is divided by elevator surface 19 to produce a first air stream directed to the interior of hull 11 and a second air stream which travels outwardly through passage 26 across rudders 40 and 41. In accordance with an important aspect of the present invention, the attitude of elevator 19 with respect to the airflow produced by propeller 23 may be varied by manipulation of lift and thrust control 20. The variable position of elevator 19 controls the relative portions of propeller airflow directed to the interior of hull 11 and rearwardly through passage 26. The portion of propeller airflow directed to the interior of hull 11 is operative by means set forth below in greater detail to produce a downwardly directed airflow which in turn provides a lifting force in the direction indicated by arrow 46 to support hovercraft 10 above its underlying surface. Air skirt 13 is operative to enhance the air cushion and lifting force provided by such airflow. The portion of propeller airflow directed outwardly through passage 26 produces a forward thrust upon hovercraft 10 driving hovercraft 10 forwardly in the direction indicated by arrow 45.

Thus, in accordance with an important aspect of the present invention, lift and thrust control 20 may be moved in the direction indicated by arrow 34 to provide an increased airflow into hull 11 which in turn increases the lifting force applied to hovercraft 10 while decreasing the forward thrust produced. Conversely, the movement of lift and thrust control 20 in the direction indicated by arrow 35 produces less lifting force upon hovercraft 10 while increasing the forward thrust. As a result and by means set forth below in greater detail, hovercraft 10 may be dynamically configured by the operator to vary the proportionate parts of propeller airflow used for lifting force and forward propulsion force to suit the operator's needs.

In further accordance with the present invention, rudders 40 and 41 are operatively coupled to steering wheel 15 and interact with the propeller airflow through passage 26 to provide a lateral force upon the rear portion of hovercraft 10 in the directions indicated by arrows 47. As is described below in greater detail, steering wheel 15 is rotated causing a corresponding angular change of rudders 40 and 41 within passage 26 producing a corresponding side force upon the rear portion of hovercraft 10 which in turn causes hovercraft 10 to turn.

In accordance with the present invention, hovercraft 10 may be operated in the following manner to provide a comfortable and easily controlled transition from a static or stationary position to a forwardly moving operation. Initially, the operator adjusts lift and thrust control 20 in the maximum position in the direction of arrow 34. By means set forth below in greater detail, this initial position of control 20 provides a maximum angle of elevator 19 and directs a maximum proportion of propeller airflow into the interior of hull 11 to produce a maximum lifting force. Thereafter, engine 21 is started and operated which in turn rotates propeller 23 causing a propeller airflow which lifts hovercraft 10 above its supporting surface in a generally stationary hovering condition. Thereafter, the operator gradually moves control 20 in the direction by arrow 35 which decreases the angular position of elevator 19 and gradually alters the division of propeller airflow to produce a reduced lifting force and a small forward thrust. In response to the operation of control 20, hovercraft 10 gradually begins moving forward. In accordance with the invention, this gradual transition from stationary hovering to forward motion provides substantial advantages of safety of operation for novices and beginners. Thereafter, with continued movement of control 20 in the direction indicated by arrow 35, a greater proportion of the airflow produced by propeller 23 is directed rearwardly through passage 26 producing a forward thrust upon hovercraft 10 and moving it in the direction indicated by arrow 45. In further accordance with an important advantage of the present invention, control 20 may be positioned in accordance with the operator's experience and skill level throughout the operation of the hovercraft. Thus, less experienced or beginner operators may find it more comfortable to maintain control 20 at some intermediate position in which stability is maximized and forward thrust or speed is less than the maximum attainable by hovercraft 10. Conversely, the needs of advanced or highly skilled operators may be met by moving control 20 to the maximum position in the direction of arrow 35 which provides a maximum proportion of propeller airflow in the thrust direction thereby providing maximum hovercraft speed. As is set forth below in greater detail, elevator 19 is configured in an aerodynamic shape corresponding to a standard wing section which provides a lifting force on the upper surface thereof. As a result, the forces exerted against elevator 19 in any given position comprise the forces directly against its upper and lower surfaces together with the lifting force created by the aerodynamic effect. As a result, very little force is required to move elevator 19 within the propeller air stream.

Once the desired forward thrust and lift force combination has been attained, the operator simply directs hovercraft 10 by rotation of steering wheel 15. By means set forth below in greater detail, manipulation of steering wheel 15 provides a change in the angular position of the rearward portions of rudders 40 and 41 to provide a lateral or steering force upon hovercraft 10. This steering force permits the operator to change the direction of hovercraft 10 as desired.

FIG. 2 sets forth a partially sectioned side view of hovercraft 10. As described above, hovercraft 10 includes a molded hull 11 defining an upwardly facing cockpit 12 which supports a seat 14 and an engine 21. Hull 11 further includes a pair of side stabilizers 30 and 31 (the former seen in FIG. 1). A generally cylindrical propeller shroud 25 is supported at the rear portion of hull 11. A pair of movable rudders 40 and 41 (the former seen in FIG. 1) is supported within propeller shroud 25. A steering wheel 15 is operatively coupled by means set forth below in greater detail to rudders 40 and 41 while a lift and thrust control 20 is operatively coupled to an elevator 19 supported within hull 11 (seen in FIG. 1). Hull 11 further defines an interior plenum 50 extending the length of hull 11 and defining a lower surface 52 and a plurality of diffusion apertures 51. In accordance with the preferred fabrication techniques, plenum 50 defines diffusion apertures 51 about its entire periphery. Lower surface 52 is utilized to support hovercraft 10 in the absence of a lifting force. An air skirt 13 fabricated of a flexible material defines a plurality of skirt segments 36 which are joined to form a continuous air skirt about the entire periphery of hull 11 enclosing plenum 50. While a variety of air skirt designs have been utilized in hovercraft, it has been found preferable to fabricate skirt segments 36 of air skirt 13 in a plurality of C-shaped inwardly facing concave elements.

In operation, engine 21 is operative to drive propeller 23 (seen in FIG. 1) to provide a propeller airflow through propeller shroud 25. As described above, a portion of the propeller airflow is directed to the interior of hull 11. The airflow within hull 11 flows into and fills plenum 50 to produce a diffused airflow outwardly through diffusion apertures 51 as indicated by arrows 53. The general C-shape and concave inwardly facing surfaces of skirt segments 36 direct the airflow from diffusion apertures 51 in a generally downward direction as indicated by arrows 37 to produce a lifting force and supporting air cushion for hovercraft 10. Once the downward thrust produced by the airflow from diffusion apertures 51 overcomes the gravitational force upon hovercraft 10, hovercraft 10 is lifted from its underlying surface and lower surface 52 no longer contacts the underlying surface. As a result, hovercraft 10 is supported entirely by the downward forces produced by airflows from diffusion apertures 51.

FIG. 3 sets forth a side view of hovercraft 10 sectioned to more clearly set forth the operation of the present invention direction and lift control. Hovercraft 10 includes a molded hull 11 forming a generally closed sealed unit defining an interior plenum 50. Plenum 50 defines a plurality of diffusion apertures 51 spaced about its periphery. A flexible air skirt 13 constructed as set forth above is supported by hull 11 and generally encloses plenum 50. Hull 11 further defines an upwardly facing open cockpit 12 having a seat 14 supported therein. Hull 11 further defines a generally cylindrical propeller shroud 25 having a cylindrical interior passage 26. Hull 11 further supports a steering wheel 15 and a lift and thrust control 20 as described above. An engine 21 is supported within cockpit 12 and is coupled to a gear drive 22 which in turn is coupled to a propeller 23 supported within passage 26 of propeller shroud 25. In accordance with the invention, hull 11 further defines a transversely extending lip 67 and a hinge 24. Hinge 24 in turn supports a generally planar airfoil shaped elevator member 19. A rudder 40 is supported within passage 26 and includes a vertically extending fixed segment 43 and a movable segment 42. As is set forth below in greater detail, movable segment 42 of rudder 40 is pivotally secured to fixed segment 43. A control cable 60 constructed in accordance with conventional fabrication techniques includes an exterior stationary sleeve 61 and an interior movable element 62. Movable element 62 defines an end connector 63 secured to lift and thrust control 20 and an end connector 64 secured to a flange 65. Flange 65 is secured to the underside of elevator 19.

In operation, engine 21 and gear drive 22 cooperate to rotate propeller 23 within passage 26 of propeller shroud 25. The rapid rotation of propeller 23 produces a rearwardly directed airflow which is divided by elevator 19 into a forward thrust flow 70 and a lift/thrust flow 71. Thus, the air drawn into passage 26 of propeller shroud 25 is divided into airflows 70 and 71. Component 71 of propeller airflow is forced between the underside of elevator 19 and lift 67 to the interior of hull 11 and plenum 50. The force provided by propeller 23 causes the air within plenum 50 to be forced outwardly through diffusion apertures 51 in a plurality of airflow streams 53. As described above, air streams 53 are directed by air skirt 13 to provide a lifting force and air support cushion for hovercraft 10. As is also described above, the thrust component 70 of propeller airflow is forced outwardly through passage 26 across rudders 40 and 41 (the latter seen in FIG. 1) to provide a forward thrust upon hovercraft 10 and move hovercraft 10 in the forward direction.

In accordance with an important aspect of the present invention, the position of elevator 19 within the propeller airflow may be altered by the position of control 20. In the position shown in FIG. 3, control 20 has been moved in the direction indicated by arrow 34 to its maximum lift position. The positioning of control 20 in the direction indicated by arrow 34 causes elevator 19 to be pivoted about hinge 24 in the direction indicated by arrow 59 to its highest or maximum counterclockwise position. When so positioned, elevator 19 directs a maximum proportionate part of the propeller airflow downwardly into plenum 50 in the direction indicated by arrow 71. Thus in the position shown in FIG. 3, hovercraft 10 is operated at maximum lift force and minimum forward direction force. As control lever 20 is moved in the direction indicated by arrow 35, cable end 63 is moved in the direction indicated by arrow 39 which in turn draws cable end 64 into stationary sleeve 61 which in turn rotates elevator 19 about hinge 24 in the direction indicated by arrow 66. As elevator 19 is rotated in the direction indicated by arrow 66, the division of propeller airflow between components 70 and 71 is altered such that thrust component 70 is increased while lift component 71 is correspondingly decreased. Control 20 may be further moved in the direction indicated by arrow 35 until elevator 19 assumes its maximum thrust/minimum lift position shown in dashed line representation. When so positioned, lift component 71 is minimized by the close proximity of elevator 19 and lift 67 while thrust component 70 is correspondingly maximized. Thus in accordance with the present invention, elevator 19 may be positioned for the desired proportion of thrust and lift force to provide the desired control of hovercraft 10. It should be noted that, as mentioned above, elevator 19 is preferably configured in a standard aerodynamic wing shape to provide an aerodynamic lift force upon elevator 19 in response to propeller airflow which in turn minimizes the force necessary to move elevator 19.

Figure 4:
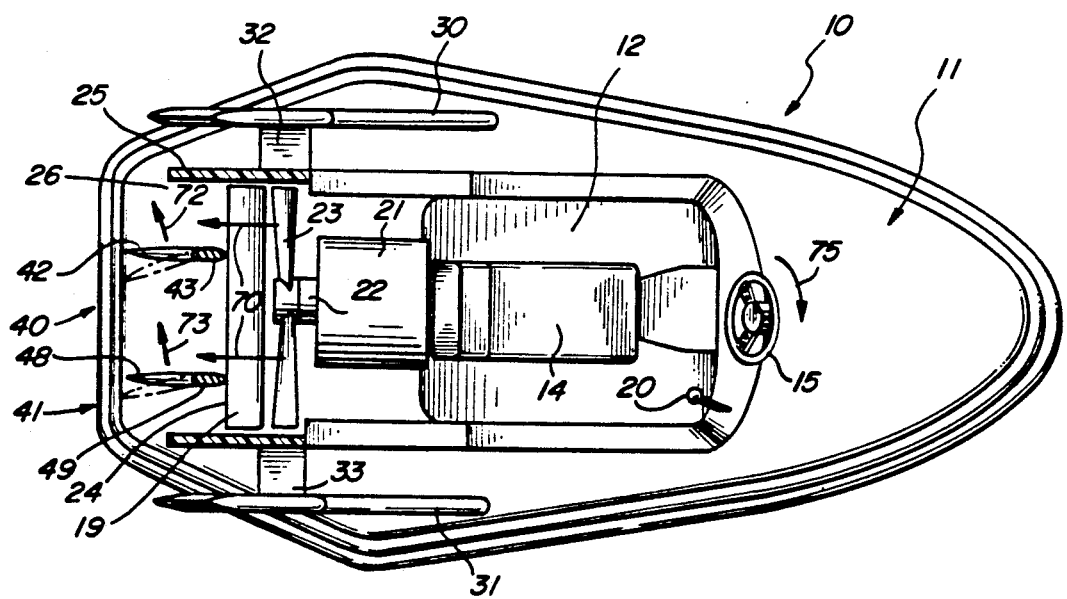
FIG. 4 sets forth a partially sectioned top view of the hovercraft of FIG. 1.

FIG. 4 sets forth a partially sectioned top view of the present invention hovercraft. Hovercraft 10 includes a molded hull 11 having a surrounding air skirt 13. Hull 11 further defines an upwardly facing open cockpit 12 supporting a seat 14 therein. Hull 11 further includes a pair of vertical generally planar stabilizers 30 and 31. A steering wheel 15 is supported within cockpit 12. A thrust and lift control 20 constructed in accordance with the above-described structure is supported within cockpit 12 of hull 11. Hull 11 further defines a generally cylindrical propeller shroud 25 having an interior passage 26 defined therein. An engine 21 is supported within cockpit 12 and is coupled to a gear drive 22. A propeller 23 is coupled to and supported by gear drive 22 within passage 26 of propeller shroud 25. A pair of wind segments 32 and 33 are coupled between stabilizers 30 and 31 respectively and propeller shroud 25. An elevator 19 constructed in accordance with the above-described structure is supported within passage 26 by a hinge 24. A pair of vertically extending rudders 40 and 41 are supported within passage 26. Rudder 40 defines a fixed segment 43 and a movable segment 42. Correspondingly, rudder 41 defines a fixed segment 49 and a movable segment 48. Movable segments 42 and 48 are pivotally secured to fixed segments 43 and 49 respectively and thus may be pivoted with respect thereto.

In operation, engine 21 and gear drive 22 cooperate to provide rotation of propeller 23 within passage 26 of propeller shroud 25. The rotation of propeller 23 produces a rearwardly directed propeller airflow indicated by arrows 70. Airflow 70 in turn propels hovercraft 10 in the forward direction. In the position shown in FIG. 4, rudders 40 and 41 are configured to provide a straight ahead motion of hovercraft 10. When so positioned, movable segments 42 and 48 are directly aligned with fixed segments 43 and 49 and thrust airflow 70 moves on either side of rudders 40 and 41 without producing any net lateral forces thereon. In the event the operator desires to execute a turn, however, a corresponding motion of steering wheel 15 must be undertaken. If, for example, the operator desires to turn hovercraft 10 to the right, steering wheel 15 is rotated in the direction indicated by arrow 75. By means set forth below in greater detail, the rotation of steering wheel 15 in the direction indicated by arrow 75 causes movable segments 42 and 48 of rudders 40 and 41 to be pivoted to the angular positions shown in dashed line representation. The angular movement of movable segments 42 and 48 of rudders 40 and 41 configures rudders 40 and 41 within propeller airflow 70 such that an aerodynamic lift force is created on the left sides thereof. This aerodynamic lift force rudders 40 and 41 is indicated by arrows 72 and 73 respectively. Thus with the pivotal movement of segments 42 and 48 of rudders 40 and 41, propeller airflow 70 provides a forward thrust together with a lateral force in the directions indicated by arrows 72 and 73. As a result, the rear portion of hovercraft 10 is caused to move to the operator's left which in turn causes hovercraft 10 to execute a right turn. In accordance with an important aspect of the present invention, the combination of movable and fixed segments of rudders 40 and 41 which permits the production of an aerodynamic lift force permits hovercraft 10 to execute turns even while virtually stationary. In contrast to prior art systems which simply move the entire rudder structure to direct the thrusting propeller airflow, the present invention structure permits hovercraft 10 to turn while stationary.

It will be apparatus to those skilled in the art that an opposite direction rotation of steering wheel 15 produces a correspondingly opposite direction pivotal motion of movable segments 42 and 48 which in turn provides a reconfiguration of rudders 40 and 41 to provide an aerodynamic lift force in the opposite direction of arrows 72 and 73. Thus, the rear portion of hovercraft 10 is caused to move to the operator's right which in turn causes hovercraft 10 to execute a left turn.

Figure 5:
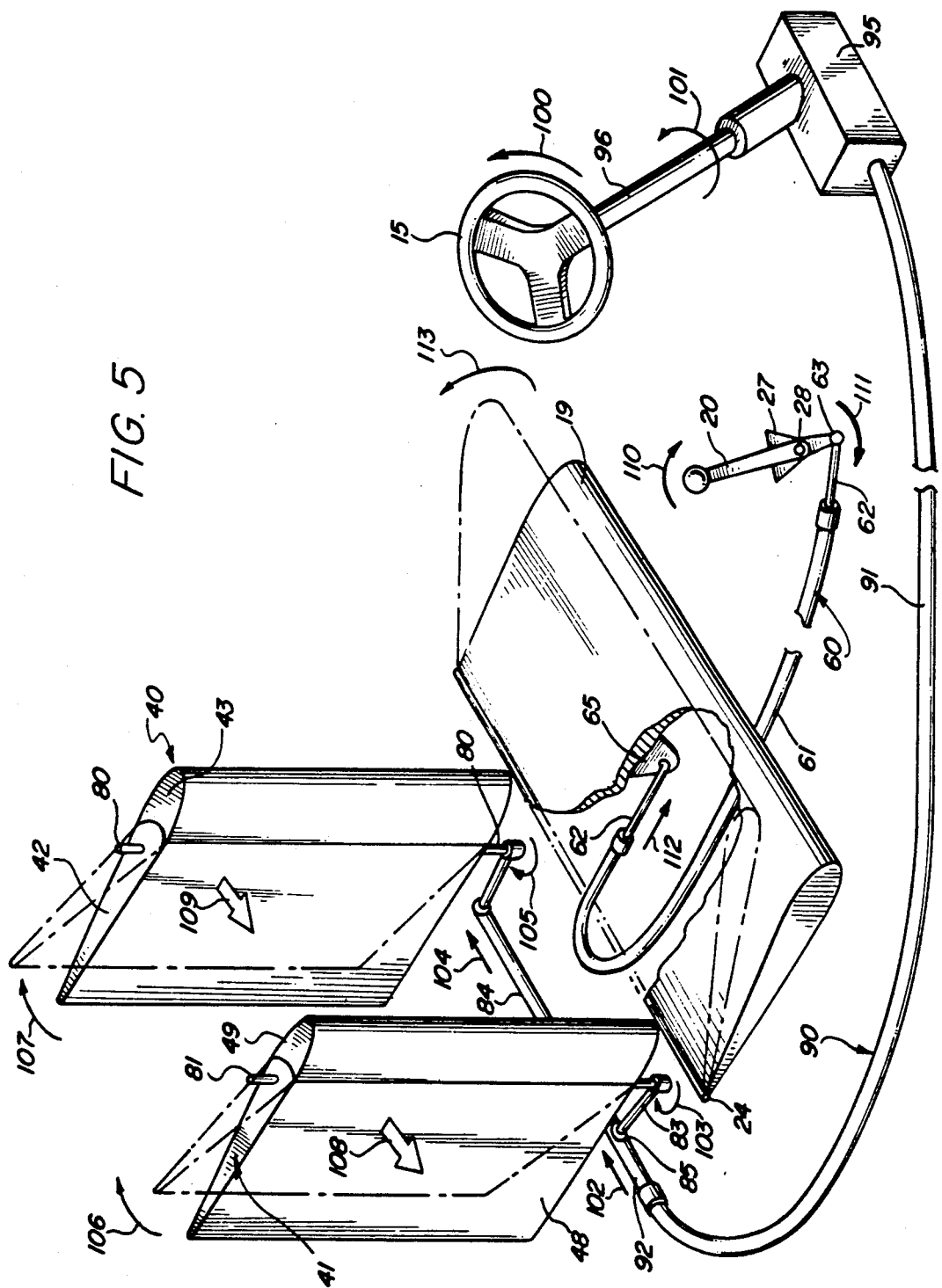
FIG. 5 sets forth a pictorial view of the present invention direction and lift control.

FIG. 5 sets forth a pictorial depiction of the present invention direction and lift control. Elevator 19, which as described above is configured in accordance with a standard wing airfoil, is pivotally supported by a hinge 24 along its rearward edge. A flange 65 is secured to the undersurface of elevator 19. A control 20 is pivotally supported by a flange 27 at a pivotal attachment 28. A control cable 60 includes a stationary sleeve 61 and a movable element 62 in coaxial arrangement. Movable element 62 defines an end 63 secured to control 20 and an end 64 secured to flange 65.

A pair of rudders 40 and 41 are vertically supported behind elevator 19. Rudder 40 includes a fixed segment 43 and a movable segment 42. Movable segment 42 is secured to a shaft 80 which provides a pivotal support for movable segment 42. Similarly, rudder 41 includes a fixed segment 49 and a movable segment 48. By way of further similarly, movable segment 48 includes a pivotal support shaft 81 extending therethrough. By means not shown, fixed segments 43 and 49 are secured within passage 26 of propeller shroud 25 (seen in FIG. 3). By further means not shown, support shafts 80 and 81 are secured to the interior of propeller shroud 25 to provide a pivotal attachment whereby the angular positions of movable segments 42 and 48 with respect to fixed segments 43 and 49 respectively may be altered as described below. A pair of tie-rods 82 and 83 are secured to the lower ends of shafts 80 and 81 respectively. A linkage arm 84 extends between and is coupled to tie-rods 82 and 83. A coaxial control cable 90 includes a stationary outer sleeve 91 and a movable interior element 92. Element 92 includes a cable end 85 secured to linkage arm 84. A rack and pinion steering unit constructed in accordance with conventional fabrication techniques is coupled to movable element 92 and includes an outwardly extending steering shaft 96. Steering shaft 96 in turn supports steering wheel 15. Rack and pinion unit 95 is operative to provide a coupling between steering shaft 96 and movable element 92 of cable 90 such that rotation of steering shaft 96 causes lateral motion of movable element 92 within stationary sleeve 91.

In operation, the position of control 20 with respect to pivot 28 is operative to position movable element 62 with respect to stationary sleeve 61. As a result, the angular position of elevator 19 with respect to hinge 24 is correspondingly defined. By way of example with control 20 initially positioned as shown, elevator 19 assumes the position shown in solid line representation in FIG. 5. In the event control 20 is moved in the direction indicated by arrow 110 with respect to pivot 28, a corresponding motion of movable element 62 in the direction indicated by arrow 111 results. The motion of end 63 of movable element 62 in the direction indicated by arrow 111 in turn causes an extending motion of cable end 64 in the direction indicated by arrow 112.

The motion of cable end 64 in turn is coupled by flange 65 to elevator 19 causing a pivotal movement of elevator 19 in the direction indicated by arrow 113 to the position shown in dashed line representation. It will be apparent to those skilled in the art that movement of control 20 in the direction opposite to that indicated by arrow 110 produces a corresponding pivotal motion of elevator 19 in the direction opposite to that shown by arrow 113. Thus, control 20 is operative to provide the desired angular position of elevator 19 which, as described above, produces the desired division between lifting and thrusting force for the present invention hovercraft.

With respect to the operation of rudders 40 and 41, FIG. 5 depicts the relative positions of movable segments 42 and 48 which correspond to the straight line or forward direction operation of hovercraft 10. With rudders 40 and 41 thus positioned, a rotation of steering wheel 15 in the direction indicated by arrow 100 causes a corresponding rotation of steering shaft 96 in the direction indicated by arrow 101. The above-mentioned operation of rack and pinion unit 95 causes movable element 92 of control cable 90 to extend outwardly from within stationary sleeve 91 in the direction indicated by arrow 102. The lateral motion of movable element 92 in the direction indicated by arrow 102 produces a corresponding lateral motion of linkage arm 84 in the direction indicated by arrow 104. As a result of the motion of movable element 92 and linkage arm 84, a rotational motion of shafts 81 and 80 in the directions indicated by arrows 103 and 105 respectively is produced. Rotation of shafts 81 and 80 causes a corresponding pivotal motion of movable segments 48 and 42 respectively in the directions indicated by arrows 106 and 107. Thus, the rotation of steering wheel 15 in the direction indicated by arrow 100 causes a pivotal motion of movable segments 42 and 48 to the positions shown in dashed line representation in FIG. 5. With rudders 40 and 41 configured in the manner shown in dashed line representation, propeller airflow across rudders 40 and 41 produces a net aerodynamic lifting force on rudders 40 and 41 in the directions indicated by arrows 109 and 108 respectively. Thus, rudders 40 and 41 are operative to produce lateral turning forces which permit the present invention hovercraft to be turned while stationary. It will be apparent to those skilled in the art that rudders 40 and 41 may be pivotally moved in the opposite direction by rotation of steering wheel 15 in the direction opposite to that indicated by arrow 100. In such case, the lateral or turning force produced by rudders 40 and 41 would also be in the opposite direction to that shown by arrows 109 and 108 respectively.

It will be apparent to those skilled in the art that while the present invention direction and lift control system has been shown utilizing coaxial control cable units to manipulate and position elevator 19 and rudders 40 and 41, the present invention system may be operated equally well while utilizing other types of control surface positioning apparatus. For example, conventional servo-control systems of the type utilized in aircraft control surfaces may be employed in place of the coaxial cable system shown in positioning elevator 19 as wells as movable elements 42 and 48 of rudders 40 and 41. Similarly, conventional hydraulic operating systems may also be used in the present invention system.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A control system for use in a hovercraft having an engine driven propeller and supporting hull, said control system comprising:

a propeller shroud enclosing the propeller such that propeller induced airflow passed into said shroud;

an elevator member, defining a closed cross-section airfoil having an upper surface and a lower surface, said lower surface defining a greater radius of curvature, said elevator being pivotally supported within said propeller shroud producing a lift force and directing a portion of the propeller induced airflow into the supporting hull as a function of the position of said elevator member; and lift/thrust control means, coupled to said elevator member, for positioning said elevator member at a desired angular position to create the desired lift force and to divert the desired portion of propeller induced airflow into the hull.

2. A control system as set forth in claim 1 wherein the hull of the hovercraft includes a plenum and an opening coupling the plenum to said propeller shroud and wherein said elevator member extends across a portion of the opening.

3. A control system as set forth in claim 2 further including a pair of rudders supported within said propeller shroud, each of said rudders including a fixed segment and a movable segment pivotally movable with respect to said fixed segment.

4. A control system as set forth in claim 3 wherein said pair of rudders each define airfoil cross sections and wherein said control system includes steering means coupled to each of said movable segments to vary the airfoil configuration of said rudders by pivoting said movable segments to produce a laterally directed aerodynamic force.

5. A control system as set forth in claim 1 further including a plurality of rudders supported within the propeller shroud, each of said rudders being articulated to present multiple airfoil configurations to the propeller induced air flow.

6. A control system as set forth in claim 5 wherein said elevator member is positioned intermediate the propeller and said rudders.

7. A control system as set forth in claim 6 wherein said plurality of said rudders is a pair.

8. A control system as set forth in claim 7 wherein said rudders each define a fixed member and a movable member pivotally secured thereto.

* * * * *